Feb. 5, 1924.
W. SCHLICHTER
PHOTOGRAPHIC PHOTOMETER
Filed Nov. 20, 1923
1,482,441
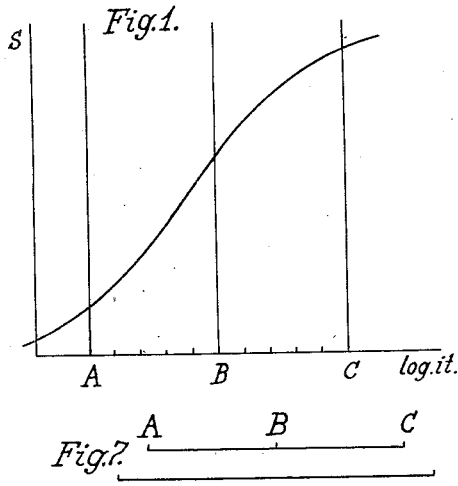
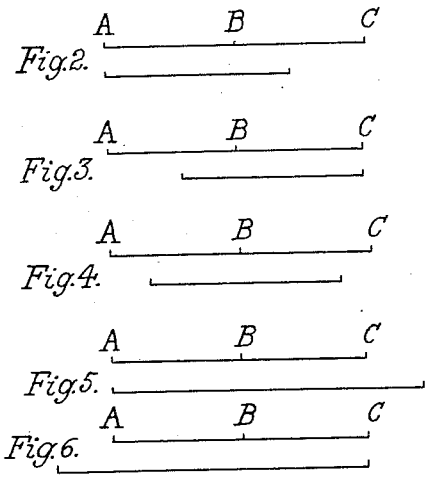
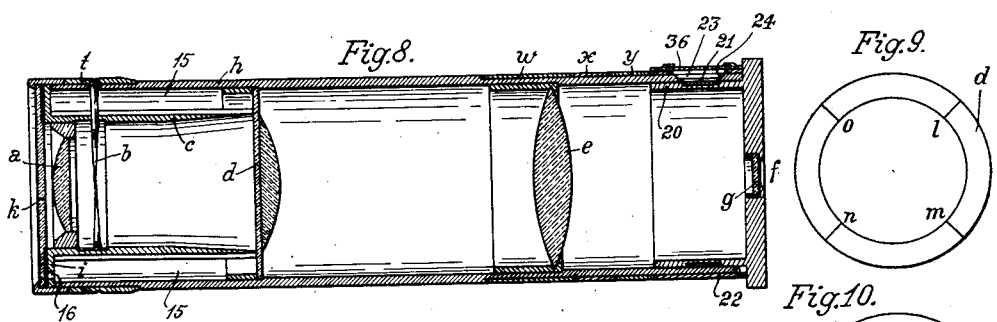
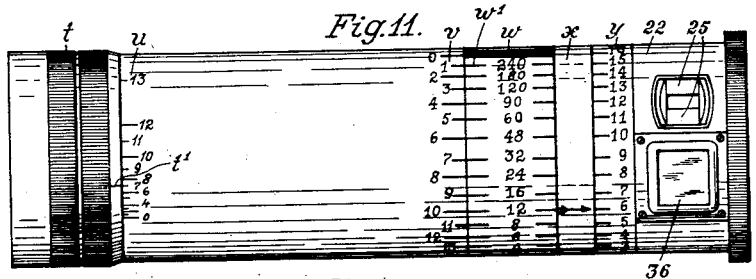
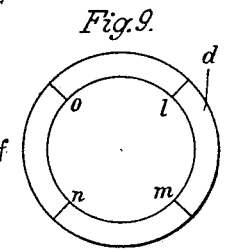
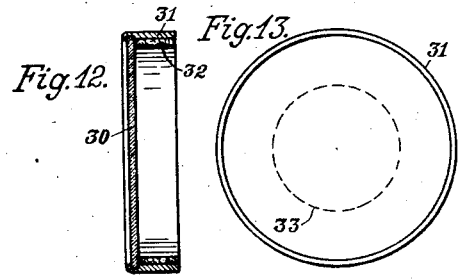
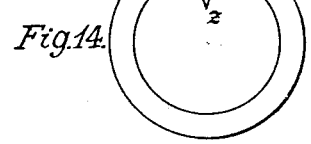
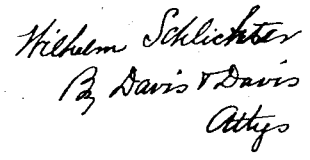
Wilhelm Schlichter
By Davis & Davis
Attys Patented Feb. 5, 1924.

1,482,441

UNITED STATES PATENT OFFICE.

WILHELM SCHLICHTER, OF FREIBURG I. BREISGAU, GERMANY.

PHOTOGRAPHIC PHOTOMETER.

Application filed November 20, 1923. Serial No. 675,877.

*To all whom it may concern:*

Be it known that I, WILHELM SCHLICHTER, a citizen of the German Republic, residing at Freiburg I. Breisgau, Germany, have invented certain new and useful Improvements in Photographic Photometers, of which the following is a specification.

My invention relates to improvements in photographic photometers, and more particularly in meters of the type in which the actinic brightness of an object or scenery to be photographed in ascertained by means of checking fields of graded illumination located adjacent to an image of the said object or scenery projected through a suitable filter, the brightness of the said picture being made to correspond to that of the checking fields by more or less filtering the rays by means of an iris stop or the like. The checking fields are illuminated either by means of a small auxiliary lamp of a standard intensity of light, or by means of rays of day light coming in the direction from the said object or scenery or the space located in front of the meter, and measuring the intensity of the day light by means of sensitized photometer paper exposed to the light and colored thereby according to a standard color. The proper time of the exposure is ascertained from the setting of the iris stop and the intensity of the auxiliary light used for illuminating the checking fields or the time exposure of the photometric paper, which values are computed together with the sensitiveness of the negative plate and the opening of the iris stop of the camera by means of a calculating scale independent of or connected with the apparatus. Instruments of this type have been described in my German Patent No. 350,236, and a brief description will be found in Scientific American of September 1923, page 183.

One of the objects of the improvements is to provide an apparatus of the class referred to by means of which the time of exposure may be determined in an exact way and taking into consideration specific purposes of the picture and the character of the negative plate. Another object is to provide an instrument in which the illumination of the checking fields may be graded at any time in a correct way. With these and other objects in view my invention consists in the matters to be described hereinafter and particularly pointed out in the appended claims.

In the accompanying drawing,—

Fig. 1, shows the logarithmic gradation diagram of a sensitized plate of the market, Figs. 2 to 7, are diagrams illustrating the relation between the diagram shown in Fig. 1 and the scale of the intensities of the parts of the object or scenery, Fig. 8, is a longitudinal section of the instrument, Fig. 9, is a detail view showing the translucent glass designed to have the image projected thereon and showing the checking fields, Fig. 10, is a similar view showing the filter placed at the front end of the photometer for grading the intensity of light falling on the checking fields, Fig. 11, is an elevation of the instrument, Fig. 12, is a sectional detail view showing a glass filter used in connection with the instrument, Fig. 13, is a side view of Fig. 12, and Fig. 14, shows a sector used for partly covering the illuminated field produced by the objective glass and used in connection with the filter shown in Fig. 12.

The operation of a photometer of the type referred to is based on the fact that the irregular values of the image of the object or scenery are brought into relation with a single light intensity, viz. the intensity used for illuminating the checking fields. This is done by photometrically balancing the brightness of the dark, median, and bright portions of the image with the different checking fields. But there arises a difficulty in so far as the portions of different brightness of the image, which may extend over a very broad area of contrast, must be brought into photometric relation to the standard checking fields which include a limited area of contrast. For example, it may be assumed that there are three checking fields, a bright one, a median one, and a dark one, and that the portions of the image are balanced by means of a shutter by means of which the brightness of the image is made equal to that of the constant checking fields. Further, the grades of the checking fields and the constant of the instrument may be such that when making a part of the image equal in brightness to the dark, the median, and the bright checking fields, exposures are obtained which correspond to the points A, B, and C of the logarithmic gradation diagram of sensitized plates of the trade shown in Fig. 1, the area from A to C being such that the scale of intensity of highly contrasting exposures is covered thereby, and that the said area is mainly represented by the median portion of the gradation diagram, which is substantially rectilinear.

Now, it may be, first, that the area of contrast of the image scale is equal to that of the checking scale, or equal to A—C, second, that it is smaller than the said scale, and, third, that it is larger. In the first case an unequivocal setting of the instrument is obtained, and the rectilinear part of the gradation diagram is made use of in the best way, if the instrument is set in such a way that the darkest portion of the image corresponds to the dark checking field, and the brightest portion of the image to the brightest checking field, in which case the scale of the picture covers the part A—C of the diagram. In the second case, which will practically prevail, there will be a certain play which may be disposed of for example in the manner shown in Figs. 2 to 4. In the said figures the shorter one of the two horizontal lines which is located below the large one represents the scale of the image, and more particularly its area of intensity and the position thereof relatively to the scale of the checking fields. In the position shown in Fig. 2 in which the darkest part of the image is set on the darkest checking field the image uses mainly the lower part of the gradation diagram, in the position shown in Fig. 3 in which the brightest part of the image is set on the brightest checking field the image uses mainly the upper part of the gradation diagram, and in the position shown in Fig. 4 the scale of the image is uniformly distributed over the median checking field and at opposite sides of the center B of the rectilinear part of the gradation diagram.

In the third case similar diagrams of the relative positions of the scale of the image and the checking fields are obtained, which diagrams have been illustrated in Figs 5 to 7, the long lines shown below the short ones representing the scale of the image, and the short or upper ones that of the checking fields. In this case the normal plate can not reproduce the whole scale of the image with a good shading. In the relative position shown in Fig. 5 the portions of the image set beyond the point C and so as to be brighter than the bright checking field are within the field of being over-exposed, in the relative position shown in Fig. 6 the parts of the image which are darker than the dark checking field and which are in front of A are in the field of underexposure, and in the relative position shown in Fig. 7, which corresponds to the diagram shown in Fig. 4, the image as a whole is uniformly distributed over the linear gradation.

Experience has shown that when providing only three checking fields and providing the area included between the bright and dark fields so large that also highly contrasting images may be included in the said area, the condition of the uniform gradation is not sufficiently satisfied in the whole area, so that the negatives obtained for example in case of small contrasts of the image with the relative positions represented by Figs. 2, 3, and 4 are not uniform as far as gradation is concerned. For example, very monotonous pictures were frequently over-exposed, when setting the same with the brighest part of the image in position corresponding to the bright checking field, as is shown in Fig. 3, and particularly where the gradation curve of the negative plate begins to become flat within the area from B to C.

If, however, the area from A to C is reduced so far that, also with plates of reduced gradation, the said area is rectilinear, the photometer fails to give good results in case of highly contrasting pictures, where an information as to the contrast area of the picture and the distribution thereof on the rectilinear part is important even for expert photographs.

It follows that a universal use of the instrument is insured only if the measuring apparatus is constructed so that the position of the scale of the image relatively to the checking scale may be more exactly ascertained.

Theoretically, this condition might be satisfied by providing a series of checking fields between the dark and bright one, instead of a single one, so that the extent and the position of the image scale may be directly read from the checking scale. However, to provide a large number of checking fields is undesirable, because thereby the cost of the instrument is increased and the operation thereof is less simple by reason of the large number of checking fields, and, particularly, because an amateur would hardly be able to set the instrument in a proper way.

The object of the improvements is to provide a photometer of the class referred to in which only a limited number of checking fields, say three of them, are provided, and in which the area of the said fields is further subdivided by properly graduating the graduation marks of the meter, so that the instrument is sufficiently simple in operation to permit the use thereof by amateurs for ascertaining the time of exposure, and that the expert is enabled to produce a picture answering specific purposes and to take into regard the character of the sensitized plate. If the ratio of the intensities of the bright and dark checking fields is $J:l$ and the logarithmic area of contrast of the checking table is $K=\log. J/l$ (which is A—C in Fig. 1), the photometering scale is graduated in such a way that, when further opening the photometer shutter by one graduation mark, the brightness of the picture is changed as a logarithmic function, or by $l/n$ when taken for example on the abscissa of the gradation diagram, $n$ being a whole number. Therefore, the contrast area included between the bright and dark checking fields is divided into $n$ scale sections of the photometer scale which are logarithmetically equal. Preferably the median checking field is such as to halve the area K. The number $n$ and the absolute value of K may be different within certain limits, a uniform arrangement of the whole instrument being obtained, if the checking scale and the photometering scale are based on the same logarithmic scale unit, which is also made use of in the calculating system connected with the instrument. The latter being ordinarily log. $\sqrt{2}$, or in a round figure 1.5, in order to obtain simple numerical relations, also K will be made: $K = n \cdot \log. \sqrt{2}$ and accordingly $J/i = \sqrt{2}^n$. Therefore, for for example, $J/i$ may be 16 or 32 and $n$ may be 8 or 10.

The photometering scale is gaged by means of the checking scale. Therefore, in the construction of the photometer it is important that the graduation of the brightness of the checking fields be exactly known and that it is possible at any time to reproduce the same with sufficient accuracy. In my improved instrument an exact graduation is obtained by admitting the light to the surfaces designed to show the checking fields through chambers having a common light dispersing front face provided for example by roughened glass which face receives the checking light and throws the same through apertures of different areas on the plane of the image and at the side thereof. Thereby I am enabled to produce a graduation which depends on the areas of the apertures so that there is no technical difficulty in producing in the checking fields the graduation which corresponds to definite values.

In order to show the manner of embodying the invention in a photometer I have shown an example in which the checking fields are disposed concentrically around the image, and in which the auxiliary light intensity is provided by the light coming from the space in front of the instrument, which light is measured in an absolutely actinic way by means of sensitized photometer paper connected with the instrument.

In Fig. 8 I have illustrated a longitudinal section of the instrument. As shown in the said figure the instrument comprises a tube $h$ containing a plate $d$ of translucent glass or roughened glass, and a tube $c$ of smaller diameter which extends from the plate $d$ to the front end of the tube and divides the plate $d$ into two concentric sections. At the front end of the tube $c$ there is an objective $a$ and at the rear of this objective is an iris stop $b$, the objective having the function to project a virtual reversed image of the object or scenery on the plate $d$, and more particularly on the inner circular portion thereof. At the rear end of the tube $h$ there is an ocular lens $e$ and an actinic filter $g$ consisting for example of cobalt glass through which the image produced on the plate $d$ may be inspected, the eye of the photographer being shown at $f$. The checking light is admitted through the annular chamber provided between the inner tube $c$ and the outer tube $h$ and bounded at the front end of the instrument by a flange $i$ connecting the said tubes and a glass plate $k$ placed thereon and at its rear end by the concentric part of the plate $d$ located between the tubes $c$ and $h$. The said chamber is divided by four radial partition walls 15 into four sectional chambers of segmental cross-section, Fig. 8 showing only two of the said partition walls, the lines of intersection of the said partition walls with the glass plate $d$ and the flange $i$ being indicated in Figs. 9 and 10 respectively by the letters $l$, $m$, $n$, and $o$, and $p$, $q$, $r$, and $s$.

The annular part of the glass plate $k$ which bounds the sectional chamber is translucent, and the part located in front of the objective glass $a$ is transparent, and the part of the flange $i$ located between the radial lines $p$ and $q$ is cut out, the part bounded by the lines $q$ and $r$ shows holes 16 of comparatively large diameter and the part bounded by the lines $r$ and $s$ shows holes of smaller area. Therefore, the annular part of the disk $k$ receives the light from the space in front of the instrument and transmits the same through the holes made in the flange $i$ to the sections or fields enclosed respectively between the lines $l$ and $m$, $m$ and $n$, and $n$ and $o$ of the translucent plate $d$, the amount of the light transmitted to the fields depending on the aggregate area of the holes made in the corresponding parts of the flange $i$. Thus the aforesaid checking fields are provided, the relative illumination of which depends on the area of the holes of the flange $i$. The chamber included between the lines $s$, $p$, $o$, and $l$ is closed at its front end so that the field included between the lines $o$ and $l$ appears black. Therefore, this field does not provide a checking field, and the sectional chamber located in front of the same is mainly used for receiving the operating pin of the iris stop.

In the example described herein the number and size of the holes of the flange $i$ is such that, when the area of the cut-out portion located between the lines $p$ and $q$ is $F_1$, the aggregate area of the holes 16 is $F_2$, and the aggregate area of the holes 17 is $F_3$, the said area are determined by the following proportion: $F_1 : F_2 : F_3 = 32 : \sqrt{32} : 1$, so that also the graduation of the intensities of the checking fields illuminated through the said apertures is determined by the said values.

The iris stop $b$ of the photometer is adapted to be operated by means of a milled ring $t$ having a mark $t^1$ movable along graduation marks $u$ provided on the outer circumference of the tube $k$. By means of the said shutter the brightness of the image within the checking fields is varied. In accordance with the foregoing theoretical discussion the said scale is a logarithmic one, the unit being log. $\sqrt{2}$, therefore there are ten scale marks on the length of the scale included between the brightest and darkest checking fields, 32 being equal to $\sqrt{2^{10}}$.

This arrangement of the scale marks $u$ shows the feature that, when successively balancing a part of the image relatively to the darkest, the median, and the brightest checking field, figures are obtained, which have for example the forms: 1, 7—6, 7—11, 7 or 2, 5—7, 5—12, 5, etc. In view of the unknown dispersion of the platen $d$ the scale can not be determined by calculation and it is gaged in the reverse way by composing such series composed of three values from different places and thus varying the absolute values, and designing the scale on the basis of the given graduation of the brightness of the checking fields in such a way that between two adjacent values of the same series there are in each case 5 scale marks.

At its rear end the instrument shows an actinic color photometer comprising an internal tube 20 adapted to receive a strip 21 of sensitized paper, and a rotary sleeve 22 formed with a peep hole 23 and adapted to cover or display a portion of the sensitized paper, which may be inspected through a slot 24 made in the wall of the tube $h$. Laterally of the said slot the tube shows two standard color fields 25 used for determining the end of the exposure of the sensitized paper.

Furthermore, a calculation system is provided at the rear part of the instrument. As shown the said system comprises a scale $v$ engraved in the outer wall of the tube $h$, a rotatable sleeve $w$ showing two scales, a rotary sleeve $x$ showing a scale and an arrow and a scale $y$ made on the wall of the tube $h$.

The value read from the scale $u$ is carried over to the scale $v$ of the logarithmic calculating apparatus. But as in my improved construction the scale $u$ is designed with logarithmically equivalent scale sections, the scale marks of the scale $v$ are equidistant. As appears for example from the scale of the ring $w$ in which the figures rise at the ratio of 2:1 when proceeding by 2 scale sections, the calculating apparatus is likewise based on the unit log. $\sqrt{2}$.

For determining the time of exposure, I proceed as follows: First, I balance the image and the checking scale by more or less opening or closing the iris stop $b$ and thus setting the brightness of the image according to the checking fields, whereby a certain figure is displayed by the scale $u$, second, I measure the light falling during the first measuring operation on the front face of the instrument and the annular part of the plate $k$ in an actinic way by means of the photometer paper 21 and the standard color 25 provided at the rear part of the instrument, and, third, I use the calculating system in the following way:

The ring $w$ is set so that the time in seconds obtained by the second operation by means of the photometer 21, 25 coincides with the value taken from the scale $u$ and carried over to the scale $v$, whereupon I read the time of exposure from the series of figures printed on the ring $w$, the correct figure of the series being the one which corresponds to the scale mark of the scale engraved at the rear of the ring $x$ and indicating the relative aperture of the camera objective, the ring $x$ being set so that the arrow 17 shows to the specific logarithmic exposure coefficient of the sensitized plate to be used in the camera which coefficient is found on the scale $y$ engraved on the wall of the tube $h$ and designed so as to be inversely proportional to the logarithm of the sensitiveness of the sensitized plate.

If now the time of exposure is considered merely as a function of the set number, all the other factors being assumed to be constant, it will be understood that for a value of the scale $u$ increased by $l$ a time of exposure is obtained which is increased by one scale section of the ring $w$, and which is therefore likewise increased at the ratio $\sqrt{2}$. Therefore, when performing a series of setting operations, by first setting a part of the image according to the darkest checking fields, and successively opening the shutter from the number thus obtained by one scale mark, ten successive exposures are obtained when proceeding to the brightest checking field, which exposures are represented in the diagram shown in Fig. 1 as a series of equidistant points dividing the area A—C into 10 longarithmetically equal parts.

Therefore it is possible to set a portion of the image according to one of the three checking fields and thereby to one of the points A, B, C of the diagram, and, further, the setting may be made according to any point of the area A—C, for example to the point 8, by balancing the image for example with the median checking field, and proceeding from the said setting three scale sections on the scale $u$, etc.

Further, the area of the contrast of the image, that is the number of the scale sections comprised thereby may be measured. For this purpose the outmost setting operations must be performed, that is, darkest part of the image=darkest field (A), or brightest part of the image=brightest field (C), and the difference of the values thus obtained as expressed in scale sections must be subtracted from or added to 10.

If, on the other hand the arithmetic middle of the outmost values obtained by the setting operation is taken, I obtain the setting in which the center of the scale of brightness of the image coincides with the median checking field, that is with the point B shown in Fig. 1, whereby in any case and independently of the extent of the contrast of the image the most uniform distribution of the scale of the image on the linear gradation is insured. This setting method is particularly important as far as the practical value of the photometer is concerned because it can be performed without any special knowledge or discrimination and by amateurs, and it gives a time of exposure independent of the image in a purely mechanical way, which time of exposure may be termed "the correct time of exposure."

The expert photographer is enabled to set the scale of the image in any position relatively to the checking scale and to choose the said position according to any considerations, for example according to the particular purpose of the exposure or the character of the sensitized plate.

Further, the photometer is constructed so that it is useful for determining the time of exposure in case of indoor photography. In indoor photography the picture is ordinarily taken from the side of the window, so that also the image and the checking fields must be photometrically computed in this direction. Therefore the checking light L falling on the head of the photometer comes from the inner part of the room and it is ordinarily so dim that the time of the exposure of the photometer paper is too long. In my improved photometer instead of the dim light reflected from the inner parts of the room the light from a window or from any other direction which is much brighter may be used for exposing the photometer paper. The intensity of the said light may be $L'$ and the reduced time of exposure resulting therefrom may be $A'$.

When setting the image while looking in the direction towards the interior of the room, and using in combination with the value thus obtained the time exposure $A'$ which is much shorter than the correct time of exposure $a$, the time of exposure would be reduced at the ratio $A'/A = L/L'$. Therefore in my improved photometer means are provided for determining the ratio $L/L'$ by a subsidiary measurement, and to compensate the error caused by introducing the value $A'$ instead of the correct value $A$ by correction of the time of exposure of the ratio $L'/L$.

The subsidiary apparatus consists of a translucent glass plate 30 adapted to be placed on the head of the photometer and a dark shutter within the field of the image which shutter has for example the form of a black sector $z$, as is shown in Fig. 14. As appears from Fig. 12 the translucent glass disk 30 is fitted in a ring 31 having a lining 32 of velvet by means of which it is placed on the head of the photometer. At the part located in front of the annular section comprising the checking fields and confined in Fig. 13 between the dotted circular line 33 and the ring 31 the translucent disk is made opaque. If therefore the translucent disk 30 is put on the head of the photometer the central field of the image appears as a uniformly light field within the dark checking fields, the sector $z$ appearing as a dark body within the said light field.

If now, starting from the maximum aperture, the shutter of the photometer is closed the illuminated field gradually loses in brightness, until finally the sector $z$ disappears. The figure set thereby on the scale $u$ and the aperture of the shutter are smaller in the degree as the light falling on the translucent disk is brighter. For example, when making the observation in a direction towards the interior of the room, so that the light intensity is L, the sector will disappear when the shutter has been set to the value 9. But near the window it will disappear by reason of the brighter light $L^1$ only when the shutter has been set to the value 3. Therefore in the second case a blinding corresponding to 6 scale sections or at the ratio $\sqrt{2^6}$ as compared to the first operation is necessary in order to obtain the same degree of darkness of the field of the image. It follows that in the present example $L'/L$ is equal to $\sqrt{2^6}$, which means that in this case the time of exposure obtained on the basis $A^1$ must be increased at the said ratio. But it is not necessary to determine the coefficient of the correction by calculation. By reason of the corresponding arrangement of the scales $u$ and $w$, from the time of exposure obtained on the scale $w$ with the value $A'$ I proceed a number of scale marks equal to the difference of the measurements made with the sector $z$ in a direction for increasing the time of exposure, whereby I obtain the corrected time of exposure from the time first obtained. In the example referred to I must proceed by 6 scale marks.

In the same way I may proceed whenever the checking light is too weak so that the photometer paper is not colored within a reasonable time, and there is a better light coming from another direction. As compared to other methods my improved correction method is preferable, because the sensitiveness of the eye is the same when making the measurements, provided the measurements are made in the same way and within a short time one after the other. Therefore the result must be a good one, and it is based on the sensitiveness of the photometer paper. The measurement is hardly less reliable than a measurement made with direct exposure, and the field of the use of the photometer is extended to conditions of light in which the determination of the time of exposure was heretofore particularly difficult.

In case of very bright sceneries the darkening of the photometer paper 21 is frequently completed with a short period of time, so that it is impossible to get exact results. It has heretofore been proposed to expose the said paper at the rear of a filter adapted to weaken the light admitted to the paper. As now practied, by thus weakening the actinic effect on the paper, the paper is made less visible to the eye, so that it is difficult or impossible to compare the color produced on the paper with the standard color. I have found that a more useful filter is obtained by making the same from a material which does not dampen the rays which are not chemically active, but only those rays which are chemically active. I have found that the sensitized papers now in use in photometers are not affected by light rays of a wave length of more than 500 μ. μ.. On the other hand, there are dyestuffs for filters in which the curve of absorption rapidly rises near the said wave lengths and shows high absorption with the whole actinic part of the spectrum, and which are very permeable in the green and yellow part of the spectrum in which the sensitiveness of the eyes is at its maximum. An example of a dyestuff of this character is the "Rapidfiltergelb" of the Höchster Farbwerke.

Therefore, my invention consists in using a filter for the photometer provided in my instrument in which the dyestuff and the dosing thereof are chosen with relation to the sensitized paper of the photometer so that, with a sufficient filtering effect increasing the time of exposure, the part of the spectrum within which the paper is exposed is absorbed in a higher degree than the yellow and green zones of the spectrum in which the sensitiveness of the eye is at its maximum.

In the construction shown in Fig. 11 the sleeve 22 is adapted to have a plate 35 placed thereon which is formed with a window 36 covered by a filter made from a gelatine film dyed with a suitable dyestuff, preferably the aforesaid "Rapidfiltergelb" of the Höchster Farbwerke.

I claim:

1. An instrument for ascertaining the time of exposure in photography, comprising a casing, means for determining the actinic value of the light, means for producing an image of the object or scene to be photographed, and a member within said casing adjacent the image and adapted to have different shades of light produced thereon, and a filter located in position for being traversed by the rays of light used for shading said member and formed in the sections corresponding to the said shades with passages of different aggregate area for the non-filtered passage of the light therethrough.

2. An instrument of the class claimed in claim 1, in which the scale of the photometer arrangement by means of which the image and the checking member are balanced is designed on the basis of the logarithm of the difference of the illumination.

3. An instrument as claimed in claim 2, in which the logarithmical unit of the scale of the photometer is $l/n$ of the extent of contrast included in the computing scale, $n$ being a whole number.

4. An instrument as claimed in claim 3, in which the logarithmical unit of the scale corresponds to the logarithmical calculating system for determining the time of exposure from the photometric value and the intensity of the checking light.

5. Instrument as claimed in claim 4, in which the common unit of the scale is $\sqrt{2}$.

6. Instrument as claimed in claim 2 equipped with a light filter and an obstructing member located in the field of vision and adapted to be made to disappear by gradually darkening the field of vision.

7. In combination, with a photometer as claimed in claim 1, the means for determining the actinic value of the light comprising a checking color, and means to expose sensitized paper, of a filter adapted to be placed in front of the paper and having high absorption within the part of the spectrum acting on the paper and a low absorption within the part of the spectrum within which the sensitiveness of the eye is at its maximum.

8. In a photometer as claimed in claim 7, in which the filter is provided by a yellow filter of the character usual in photography.

In testimony whereof I affix my signature in presence of two witnesses.

WILHELM SCHLICHTER.

Witnesses:
HOWARD TAYLOR,
ERIC W. SPARTZ.